Figures 1, 2, 3:
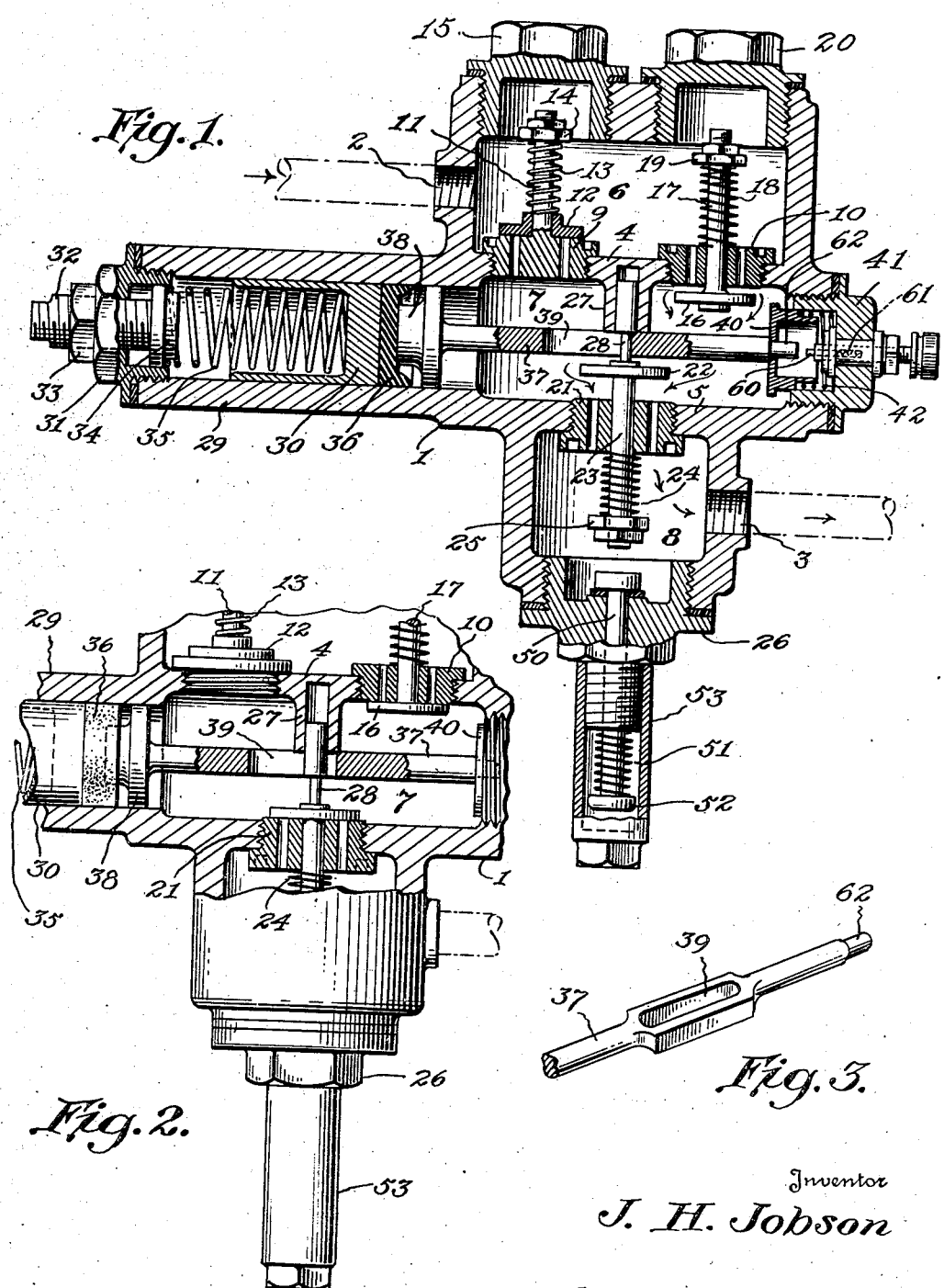

March 7, 1939.　　　　J. H. JOBSON　　　　2,149,295
SAFETY VALVE FOR HYDRAULIC BRAKES
Filed Nov. 27, 1937

Inventor
J. H. Jobson
By Eccleston & Eccleston,
Attorneys

Patented Mar. 7, 1939

2,149,295

UNITED STATES PATENT OFFICE 2,149,295

SAFETY VALVE FOR HYDRAULIC BRAKES

John H. Jobson, Mentone, Ala.

Application November 27, 1937, Serial No. 176,924

8 Claims. (Cl. 303—84)

This invention relates to fluid pressure brakes and has for its primary object to provide a safety device for use with hydraulic or air brakes for automobiles, trucks, etc.

In the operation of fluid pressure brakes it sometimes happens that a leak is caused in a line leading to one or more of the brakes. Such leaks are quite dangerous due to the fact that all brakes on a vehicle are operated from the same pressure source and a leak in any one of the branch lines or brake cylinders will therefore render the entire braking system of the vehicle ineffective. To avoid serious accidents which might easily result from such failure of the braking system, the present invention has for its object to provide an automatically operated valve which will serve to shut off from the main pressure system any one or more of the branch lines leading to the individual brakes whenever a leak occurs in such lines.

A further object of the invention resides in the provision in a safety attachment as above mentioned, a circuit closer for use in an electrical signalling system to warn the driver whenever a leak occurs in the braking system.

Other objects and advantages of the invention will be apparent from the following description when taken in connection with the accompanying drawing in which, Figure 1 is a sectional view through one of the devices showing the sentinel valve open.

Figure 2 is a side elevational view partly in section, showing the sentinel valve closed, and Figure 3 is a perspective view of one of the latching elements.

Referring to the drawing in detail, the numeral 1 indicates generally a system of valves for use in shutting off a branch line to one or a plurality of brakes in a fluid braking system. If the disclosed mechanism is associated with a branch line extending to a single brake then it will be understood that four of the mechanisms, as a unit, would be installed in the pressure system, whereas, if the mechanism is associated with a line extending to both front brakes or both rear brakes, then only two of the mechanisms would be installed. Since the mechanisms are duplicates a disclosure of one of them will suffice.

The casing 1 is provided with apertures 2 and 3 for the attachment of inlet and outlet pipes respectively, leading from the source of fluid supply and to one or more brakes, as the case may be. Extending transversely of the interior of the casing are partitions 4 and 5 providing compartments 6, 7 and 8.

Mounted in threaded openings formed in the partition 4 is a pair of apertured plugs or valve seats 9 and 10. The valve seat 9 is provided with a valve stem 11 on which is slidably mounted a disc valve 12, and a coil spring 13 normally holds the valve in position to close the passages in the plug 9. A nut 14 is threaded on the upper end of stem 11 and provides for adjusting the spring pressure on the valve. The spring of this valve is preferably of sufficient strength to retain ten pounds working pressure in compartment 7, and automatically opens to allow the escape of fluid when pressure on the brake pedal is removed. The casing 1 is provided with a closure 15 directly above valve 12 to permit access to the adjusting nut 14.

Cooperating with valve seat 10 is a valve 16, opening in the direction of flow through the casing, and provided with a stem 17 extended upwardly through the plug. A coil spring 18 is mounted on the valve stem 17 and a nut 19 threaded on the upper end of the stem serves to adjust the pressure on the valve. Access to this valve may be had through closure 20.

Mounted in the lower partition 5 is an apertured plug or valve seat 21 provided with a disc valve 22 opening in a direction against the flow of fluid. The valve 22 is provided with a stem 23 extending downwardly through seat 21 and a coil spring 24 tending to pull the valve down to its seat. An adjusting nut 25 is provided on the lower end of the valve stem. Access to the nut 25 may be had through closure 26 threaded into the lower end of the casing.

The valve stem 23 is extended upwardly beyond valve 22 and has its upper end slidably received in a downwardly-extending pocket 27 formed on partition 4. This upwardly extending member is provided with a reduced portion 28 to form a latch element for cooperation with another latch element to be described.

Extending laterally from the main body of the casing 1 and communicating with the chamber 7 thereof is a cylinder 29 provided with a piston 30. The outer end of this cylinder is closed by a threaded member 31 which is in turn provided with a threaded bolt 32. A lock nut 33 is mounted on bolt 32, and the opposite or inner end of the bolt is provided with a seat or bearing 34 for one end of a coil spring 35. The opposite end of spring 35 is in engagement with the piston 30 and tends to move it to the right as viewed in Figure 1. This piston is provided with a rubber cup or disc 36 to prevent leakage, and a tripping plunger 37 has its head 38 in engagement with the disc.

The opposite end of plunger 37, which is formed with a slotted section 39, is fixed in a head 40. This head is slidably mounted in a cavity formed in the inner face of a closure 41, and a spring 42 mounted in the cavity is of sufficient strength to bias the head toward the left (Fig. 1) and maintain the head 38 in contact with the piston cup 36.

As will be obvious from a comparison of Figures 1 and 2 the valve 22 is held in open position by the tripping plunger 37 until such time as the plunger is moved to the right, at which time the spring 24 will move the valve onto its seat. Movement of the plunger 37 to the right is caused by spring 35, but is permitted only at such time as the pressure in compartment 7 is reduced below the normal working pressure. In order to reset the valve 22 after it has been closed a manually-operated plunger 50 is provided. This plunger is slidably mounted in the closure plug 26 and is normally retained in retracted position by means of a coil spring 51 disposed between the plunger head 52 and a portion of the closure 26. A screw cap 53 normally incloses the resetting plunger and its spring.

In order that the operator of the vehicle may be warned by either a visual or an audible signal whenever a leak occurs in the fluid pressure line an electrical circuit closer is provided. This construction includes a contact 60 normally biased to the left (Fig. 1) by means of a spring 61. Adapted to cooperate with contact 60 is a contact 62 which is formed as an extension of the tripping plunger 37. The contact 60 is mounted in a fitting extending exteriorly of the closure 41 and is provided with means for connecting an electric wire for signalling purposes. It will be obvious therefore that when reduced pressure in the system allows the plunger 37 to move to the right the contacts 60, 62 will be brought together thereby closing the electrical circuit and causing an operation of the signal.

The operation of the mechanism will now be described.

The device having been installed and all air removed from the system, if of the hydraulic type, pressure is exerted on the brake pedal to exceed 10 or 15 pounds, the work pressure, thereby forcing the piston 30 and plunger 37 to the left. The enlarged head of the pin 28 limits the leftward movement of the plunger until the manually-operated plunger 50 is operated to lift valve 22 and bring the cut-away portion of pin 28 into the slot 39. The plunger 37 then moves entirely to the left as indicated in Figure 1, and holds pin 28 and valve 22 in elevated position.

The braking system is now ready for operation and remains in operative condition until such time as a leak occurs in one of the lines. The escape of fluid from the line to which the particular sentinel valve is attached will cause the pressure to drop below the ten pounds working pressure and immediately allows the spring 35 to move the tripping plunger 37 to the right. This movement of the plunger will release the latch or pin 28 of valve 22 and allow spring 24 to move the valve to closed position, thereby completely shutting off the leaking line from the remainder of the system, and permitting normal operation of the other brakes of the vehicle. After the leak is repaired the valve 22 of the line may be reset by operation of the plunger 50, and the entire braking system again placed in operative condition.

Operation of the tripping plunger to allow valve 22 to close will also close the electrical circuit of which contact 60 forms a part, and will thus cause to be operated any electrical signal which may be placed in the circuit.

From the foregoing description taken in connection with the accompanying drawing it will be apparent to those skilled in the art that I have devised a relatively simple and inexpensive construction of sentinel valve for fluid brakes that it is of strong and durable construction and reliable in operation; that it may be readily reset after the leak which caused its operation is repaired; and that it is well suited to the operation of a visible or audible electrical signal if desired.

In accordance with the patent statutes I have described what I now consider to be the preferred form of construction, however, it will be apparent that various changes may be made in the structural details without departing from the spirit of the invention, and it is intended that all such changes be included within the scope of the appended claims.

What I claim is:

1. A safety valve mechanism for fluid pressure vehicle brakes, including a casing adapted to be mounted in a line leading to a brake, a valve for admitting pressure fluid to a compartment of the casing, a spring-pressed valve for preventing the exit of pressure fluid from said compartment, and means for normally holding the second-mentioned valve in open position, said means including a pressure-controlled plunger.

2. A safety valve mechanism for fluid pressure vehicle brakes, including a casing adapted to be mounted in a line leading to a brake, a valve for admitting pressure fluid to a compartment of the casing, a spring-pressed valve for preventing the exit of pressure fluid from said compartment, a reciprocably mounted plunger for normally holding the second-mentioned valve in open position, pressure-controlled means for moving the plunger to valve-holding position, and a spring for moving the plunger to releasing position.

3. A safety valve mechanism for fluid pressure vehicle brakes, including a casing adapted to be mounted in a line leading to a brake, a valve for admitting pressure fluid to a compartment of the casing, a spring-pressed valve for preventing the exit of pressure fluid from said compartment, a latch connected to the second-mentioned valve, a reciprocably mounted plunger normally cooperating with the latch to hold the valve in open position, pressure-controlled means normally holding the plunger in operative position, and means for moving the plunger to inoperative position.

4. A safety valve mechanism for fluid pressure vehicle brakes, including a casing adapted to be mounted in a line leading to a brake, a valve for admitting pressure fluid to a compartment of the casing, a spring-pressed valve for preventing the exit of pressure fluid from said compartment, a cylinder communicating with the compartment, a piston and plunger in the cylinder, means on the plunger for normally maintaining the last-mentioned valve in open position, and a spring for moving the plunger to valve-releasing position when the pressure in the cylinder is reduced beyond a predetermined amount.

5. A safety valve mechanism for fluid pressure vehicle brakes, including a casing adapted to be mounted in a line leading to a brake, a valve for admitting pressure fluid to a compartment of the casing, a spring-pressed valve for preventing the exit of pressure fluid from said compartment, a cylinder, communicating with the compartment, a piston and plunger in the cylinder, cooperating means on the plunger and last-mentioned valve for normally maintaining the valve in open position, a spring for maintaining the plunger in contact with the piston, and a spring engaging the piston to move the piston and plunger to valve-releasing position when the pressure in the compartment is reduced beyond a predetermined amount.

6. A safety valve mechanism for fluid pressure vehicle brakes, including a casing adapted to be mounted in a line leading to a brake, a valve for preventing the exit of pressure fluid from the casing, a reciprocably mounted plunger for normally holding the valve in open position, a piston and cylinder associated with the plunger and adapted to move the same to valve-holding position, a spring for moving the plunger to releasing position under certain conditions to allow the valve to close, and means for resetting the valve after it has been closed.

7. A safety valve mechanism for fluid pressure vehicle brakes, including a valve casing adapted to be mounted in a line leading to a brake, a valve for controlling the passage of fluid through said casing, means for automatically closing the valve, a reciprocably mounted plunger for normally holding the valve in open position, fluid pressure operated means connected with the plunger and adapted to move the same to valve-holding position, and means for automatically moving the plunger to releasing position.

8. A safety valve mechanism for fluid pressure vehicle brakes, including a valve casing adapted to be mounted in a line leading to a brake, a valve for controlling the passage of fluid through said casing, means for automatically closing the valve, a reciprocably mounted plunger for normally holding the valve in open position, fluid pressure operated means connected with the plunger and adapted to move the same to valve-holding position, means for automatically moving the plunger to releasing position, and a manually operated resetting member for cooperation with said valve.

JOHN H. JOBSON.